(12) United States Patent
Cordova

(10) Patent No.: US 7,455,725 B2
(45) Date of Patent: Nov. 25, 2008

(54) WASHABLE MARKER INK COMPOSITION

(75) Inventor: Abimael Cordova, Whittier, CA (US)

(73) Assignee: Mattel, Inc., El Segundo, CA (US)

( * ) Notice: Subject to any disclaimer, the term of this patent is extended or adjusted under 35 U.S.C. 154(b) by 105 days.

(21) Appl. No.: 10/944,980

(22) Filed: Sep. 20, 2004

(65) Prior Publication Data

US 2006/0063856 A1   Mar. 23, 2006

(51) Int. Cl.
*C09D 11/00*   (2006.01)
*C09D 11/16*   (2006.01)

(52) U.S. Cl. .................. 106/31.6; 106/31.71; 523/160; 523/161; 524/162; 524/548

(58) Field of Classification Search ................ 523/160, 523/161; 524/162, 548; 106/31.6, 31.71
See application file for complete search history.

(56) References Cited

U.S. PATENT DOCUMENTS

| | | | | |
|---|---|---|---|---|
| 4,505,944 A | * | 3/1985 | Turner | 427/8 |
| 4,940,555 A | | 7/1990 | Eckhardt et al. | 252/543 |
| 5,116,410 A | * | 5/1992 | Miller | 106/31.58 |
| 5,124,205 A | * | 6/1992 | Raynolds et al. | 428/364 |
| 5,262,535 A | * | 11/1993 | Kaiser | 544/402 |
| 5,360,457 A | * | 11/1994 | Ruggiero et al. | 8/567 |
| 5,486,228 A | * | 1/1996 | Miller et al. | 106/31.32 |
| 5,492,558 A | * | 2/1996 | Miller et al. | 106/31.43 |
| 5,498,280 A | | 3/1996 | Fistner et al. | 106/19 B |
| 5,503,665 A | * | 4/1996 | Miller et al. | 106/31.16 |
| 5,665,695 A | * | 9/1997 | Kaiser | 510/495 |
| 5,972,088 A | * | 10/1999 | Krishnan et al. | 106/31.73 |
| 6,040,359 A | | 3/2000 | Santini et al. | 523/161 |
| 6,160,034 A | | 12/2000 | Allison et al. | 523/161 |
| 6,174,938 B1 | | 1/2001 | Miller et al. | 523/164 |
| 6,258,873 B1 | * | 7/2001 | Gundlach et al. | 523/160 |
| 6,274,645 B1 | * | 8/2001 | Gundlach et al. | 523/160 |
| 6,517,619 B1 | * | 2/2003 | Nowak et al. | 106/31.32 |
| 6,702,881 B2 | * | 3/2004 | Hano et al. | 106/31.15 |
| 6,852,157 B2 | * | 2/2005 | Hirschmann et al. | 106/31.64 |
| 2006/0024340 A1 | * | 2/2006 | Elder et al. | 424/401 |

OTHER PUBLICATIONS

STN [online] Structure of Uvitex NFW [Retrieved on Jan. 5, 2007]. Retrieved from the Internet <URL: http://stnweb.cas.org/cgi-bin/sdcgi?SID=1351698-1352438176-200&APP=stnweb&>.*

* cited by examiner

*Primary Examiner*—Sanza L McClendon
(74) *Attorney, Agent, or Firm*—Robert W. Mulcahy

(57) ABSTRACT

The present invention provides a fluorescent marker ink coloring composition incorporating an optical brightener, a film-forming agent, an aqueous carrier, and a colorant. The optical brightener is an amphoteric distyryl fluorescent whitener which generates a special effect in the dried marking ink composition. The coloring composition can optionally include one or more of a humectant, a surfactant, a preservative, a drying agent, a pH regulant, a bittering agent or a fragrance. The present invention further provides a writing instrument comprising the coloring composition.

8 Claims, No Drawings

WASHABLE MARKER INK COMPOSITION

FIELD OF THE INVENTION

The present invention relates generally to the field of washable wet ink coloring compositions for drawing and coloring purposes. In one particular aspect, the invention relates to writing instruments containing washable liquid coloring compositions comprising fluorescent colorant formulations, and more specifically to the formulations of coloring ink compositions for use in markers. Further, washable coloring compositions are provided which are suitable for use on both paper and hard substrate surfaces and are particularly suitable for use in childrens coloring instruments.

BACKGROUND OF THE INVENTION

Whiteboards, also known as dry erase boards, are commonly used in offices, schools, and other locations where a chalkboard might otherwise be found. Writings on a dry erase board are erasable by wiping lightly with felt, dry cloth or paper. Suitable whiteboard surfaces generally include a melamine, vinyl, polyethylene laminate, polyvinyl chloride or enamel resin layer affixed to a backing. Such whiteboards are characterized in that they have hard, white surfaces that are very smooth in appearance, and are essentially nonporous. Alternatively, a whiteboard may comprise a sheet of polymeric film such as an acrylic or UV curable resin. Of course each of these "whiteboard" materials may be used in other articles of manufacture such as plastic writing boards used in children's toys.

Coloring compositions are employed to mark a wide variety of substrates. In addition to hard surfaces such as whiteboards, the most commonly employed substrate is paper (or a paper-like material), which is produced in many qualities. In many respects, paper presents a superior writing surface. The surface of paper is generally smooth and even. Moreover, the porosity of paper assists the writing process by drawing the coloring composition into the paper matrix, promoting even application and smooth appearance. However, porous paper is not an ideal writing substrate for all applications. For example, many types of paper (e.g., newsprint, or the highly porous paper commonly employed in children's coloring books) are sufficiently porous to draw a coloring composition through the paper to create a mark on the surface opposite that desired, thereby rendering it difficult to employ both sides of a single sheet of paper. This is commonly referred to as "strike-through" of the ink. Moreover, inks which strike through (or bleed through) paper can actually leave marks on surfaces supporting the paper (such as succeeding sheets of paper in a book, clothing, furniture, and the like). Also, strike-through dulls or reduces the presentation of the color.

Efforts aimed at reducing drying time and strike-through of water-based marker inks have proven largely unsuccessful. Some commercially available inks reduce strike-through by incorporating additives which substantially increase the viscosity of the coloring composition. For example, hyperthermogelling inks incorporating a high amount of surfactants exhibit a phase change due to the evaporation of a given amount of water (e.g., U.S. Pat. No. 5,462,591). While such inks are useful for some applications (e.g., commercial printing presses), they are too viscous for use in common writing instruments, such as capillary markers with porous nibs.

One other area of marker ink technology that has undergone change over the past several years is that relating to pigments. The introduction of new pigments over this period has provided ink developers with the ability to produce wet markers having a variety of vivid and attractive colors. This increase in the availability of colors and hues in coloring compositions has fueled the demand for further improvements in the properties of wet markers, generally. One of the areas of crayon and ink marker development which has been affected by the foregoing may be characterized as the area of "special effects."

One area of special effect is fluorescence. This property is obtained by the use of fluorescers, which are substances which emit electromagnetic radiation (usually as visible light) resulting from (and occurring only during) the absorption of radiation from some other source. Examples of pigments which fluoresce under daylight conditions are described in U.S. Pat. No. 3,939,093. Such fluorescent pigments have also been included in marking compositions, e.g., U.S. Pat. No. 3,057,806, which describes fluorescent crayons.

One U.S. patent which discloses special effect pigment compositions which comprise a combination of common pigments, phosphorescent pigments, and fluorescent pigments, is U.S. Pat. No. 4,725,316. These pigment compositions are alleged to be combinable with translucent plastics, resins, and natural and synthetic rubbers. However, there is no mention of their use in connection with liquid markers. U.S. Pat. No. 5,498,280 discloses a crayon marking coloring composition comprised of a mixture of phosphors and fluorescers in a polyethylene glycol wax binder, with no application to capillary markers. Neither prior art patent demonstrates a special effect liquid ink composition for use in a general purpose marker for writing on both soft and hard substrate surfaces.

In view of the foregoing problems, there exists a need for a special effect coloring liquid ink composition that is quick-drying and which exhibits limited or little strike-through when applied to porous papers such as coloring book paper. There is also a need for such compositions that are washable from skin and common fabrics. Furthermore, such compositions are needed which are suitable for use in common ink-based writing instruments (e.g., capillary markers). The present invention meets these needs and provides a low bleed coloring composition suitable for use in common ink-based marking instruments.

SUMMARY OF INVENTION

The present invention provides a liquid ink coloring composition having an enhanced level of special effects which, when provided in the form of a marking applicator, provides a high quality mark on a variety of surfaces (e.g., has good laydown and color uniformity), has good mechanical strength and appearance, and relatively low levels of hygroscopicity and toxicity. More specifically, the invention is directed to an aqueous coloring composition incorporating a film-forming agent and a colorant comprised of a pigment and/or dye in combination with a fluorescent whitener agent. The aqueous coloring composition can optionally include one or more of a humectant, a surfactant, a preservative, a drying agent, a pH regulant, a bittering agent or a fragrance. The coloring composition is sufficiently fluid for use in standard writing or marking instrunents, yet it minimally permeates highly porous substrates. Moreover, the coloring composition retains superior color stability, remains fluid during prolonged storage, and is readily washed from skin and common fabrics. The viscosity of the coloring composition can be sufficiently low to be compatible with a variety of commonly employed capillary markers.

The discovery of the instant invention is that one may incorporate into a water soluble dye and/or pigment containing liquid ink composition an additive in the form of an optical brightener or whitener which imparts "glow" both in normal light and in darkness under the influence of a fluorescent light source. The whitener additive is a fluorescent agent from the family of amphoteric distyryl compounds, in particular distyryl biphenyl derivatives. This family of optical brighteners has been found to be particularly effective with small pigment particle size dispersions as the colorant.

The instant coloring composition is useful for forming marks on a variety of surfaces, for example, hardboard substrate surfaces such as polyvinyl chloride and other plastic surfaces or highly porous paper (or paper-like) surfaces. The mark is formed by applying the aqueous coloring composition to the surface such that the film-forming agent forms a hydroresistant film adhering to the surface; the colorant is then entrapped within the matrix of the film. Such marks are quick drying and exhibit minimal strike-through to the opposite surface of a porous substrate (such as paper).

Another aspect of the invention is a writing instrument incorporating the aqueous coloring composition of the invention. In a preferred embodiment, the writing instrument has a nib and a reservoir containing the coloring composition.

The invention can best be understood with reference to the accompanying detailed description of the preferred embodiments.

DETAILED DESCRIPTION OF INVENTION

The present invention advantageously incorporates an optical brightener in the form of a fluorescent whitener into a water-based coloring composition to produce marking ink compositions having a unique special effect when dried. The coloring compositions of the present invention have a superior visual appeal which makes them suitable for use in a wide variety of applications.

The discovery of the present invention is that one may incorporate into a water-soluble dye and/or pigment containing ink coloring composition an optical brightener or whitener additive which will impart special visual effects, in the form of a fluorescent glow effect, to the ink. At the same time, it has been discovered that the whitener additive will noticeably enhance fugitivity from fabrics ordinarily used in children's clothing. Thus, in accordance with the present invention, one may produce a washable water-soluble dye and/or pigment containing composition which has unexpected special visual effect as well as good fugitivity from skin and, in most instances, enhanced fugitivity from textiles and skin.

More specifically, the discovery is that a materials otherwise known for their whitener properties, namely, amphoteric distyryl compounds, are effective to impart special glow visual effects to liquid ink coloring compositions. Additionally, the discovery is that these unexpected results are achieved by the use of relatively high concentrations of the amphoteric distyryl compounds, inasmuch as such materials have traditionally been employed in relatively low concentrations as whiteners in detergent compositions. The amphoteric distyryl compounds of the instant invention are those compounds and chemical structures disclosed in U.S. Pat. No. 4,940,555 hereby incorporated by reference in its entirety. Particular compounds include distyryl biphenyl derivatives and in particular Disodium Distyrylbiphenyl Disulfonate sold under the product name Tinopal CBS-X by the Ciba-Geigy Corporation of Ardsley, N.Y.

The amount of amphoteric distyryl additive present in the coloring compositions of the invention depends upon the level of fluorescent special effect desired and the amount of dye or pigment in the instant coloring composition. At a minimum, the amphoteric distyryl compound must be present in an amount sufficient to impart the glow effect of the instant composition as well as washability in terms of skin and fabric fugitivity. These effects are seen with as little as about 1% by weight of the amphoteric distyryl product ingredient in the total coloring composition. Even greater glow characteristics as well as washability is achieved when about 3.5% by weight of the active amphoteric distyryl product ingredient is used as Tinopal CBS-X. In general, a greater amount of the amphoteric distyryl whitener additive present in the ink coloring composition leads to better washability from fabric, skin and other surfaces. However, at a certain point, the addition of more amphoteric distyryl additive whitener product does not yield any improvement in the special fluorescent glow effect or the washability of the composition. The upper limit of the whitener additive concentration may also be imposed by constraints on the viscosity and the long term stability of the ink compositions of the invention. For example, the instant ink coloring composition cannot have a significantly viscous consistency or it will not flow through a marker nib when used in the form of a marker ink. Accordingly, the concentration of amphoteric distyryl whitener product additive as a functional ingredient in the instant composition is in an amount of from about 1% to about 20% by weight of the active product ingredients in the total coloring composition.

As indicated, the minimal beneficial effect of the amphoteric distyryl additive occurs at a concentration of at least about 1% by weight of the colorant composition. Preferably, the amphoteric distyryl whitener component is present in an amount of from about 2% to about 15% by weight of the total colorant composition. Most preferably, about 5% to about 10% by weight of the amphoteric distyryl whitener additive based on the total colorant composition used in the marking ink compositions of the invention.

The liquid ink marking compositions of the invention also include one or more colorants. As used herein, the term "colorant" includes any agent capable of delivering a color to a substrate upon which it is applied. Thus, colorants can be dyes (i.e., soluble colorants), pigments (i.e., insoluble or particulate colorants), or any other suitable agent compatible with the composition components. Colorants are commercially available in suitable preparations, such as aqueous solutions containing dyes, or aqueous dispersions containing pigments.

One suitable type of colorant for use in compositions of the present invention are acid dyes. By way of illustration, and not in limitation, acid dyes that have been found suitable for use in this invention are Acid Violet 12, Acid Green 3, Acid Blue 9, Acid Yellow 17, Acid Yellow 23, Acid Red 52 and Acid Red 388. Yellow F.D.& C. #6 may also be used.

Another category of suitable colorants for use in the present invention is polymeric dyes. Polymeric dyes are characterized as having polymeric chains covalently bonded to a chromophore molecule. By way of illustration, and not limitation, polymeric dyes suitable for use in the marking ink compositions of the invention include Palmer Scarlet.™., Palmer Blue.™., Palmer Magenta.™., and Experimental Palmer FL Red A 10.™. These polymeric dyes are commercially available from Milliken Chemical and may be covered by one or more of U.S. Pat. Nos. 4,981,516, 5,043,013, and 5,059,244, the disclosures of which are incorporated herein by reference. Other polymeric dyes useful in the practice of the invention include polyalkyleneoxy-substituted chromophore compounds such as, for example, alkyleneoxy-substituted methine colorants. While certain ink compositions containing polymeric dyes have been removed from skin by rubbing with soap and water, the marking ink compositions of the present invention can be rinsed off using water alone. Also, the ink compositions of the present invention can be easily washed off or more completely removed from many previously staining surfaces such as wallpaper, painted walls, wood, etc.

Another type of colorant suitable for preferred use in the washable coloring compositions of the present invention is pigments. Examples of suitable pigments include inorganic pigments such as titanium dioxide or ferric oxide, or organic pigments such as carbon black, phthalocyanines (e.g., copper phthalocyanine blue), azo pigments, quinacridones, anthraquinones, dioxazines, indios, thioindios, perynones, perylenes, indolenones and azo-azomethines. Encapsulated pigments may also be utilized. To achieve good coloring and promote compatibility with the remaining ink components, it is preferred that the pigment may be utilized in the form of an aqueous dispersion, inasmuch as pigments are by definition insoluble materials. Pigment dispersions are commercially available which are combinations of a pigment, an aqueous based carrier, one or more resins, and a surfactant or dispersant system. A pigment dispersion may also be prepared specifically for use in the coloring compositions of the invention. From the standpoint of convenience, a commercial pigment dispersion is preferred for use in the present invention. Typical commercial dispersions contain 30 to 74% by weight active pigment ingredients. Examples of suitable pigment dispersions include Hostafine Rubine F6B (C.I. Pigment Red 184 dispersion), Blue B2G (Pigment Blue 15-3), Black T (Pigment Black 7), and Yellow GR (C.I. Pigment Yellow 13) marketed by Clariant Corporation under the tradename "Hostafine Dispersions." Pigments may optionally be used in the inventive coloring composition in any concentration necessary to give the desired color effect provided that the pigment does not raise the viscosity of the composition to an unacceptable level. The typical concentration of the coloring composition of the present invention containing a pigment colorant is from about 0.1% to about 10% by weight of the coloring composition.

In general, a workable pigment dispersion can have a wide or narrow particle size range depending on the delivery system used for the coloring composition. The lower limit on pigment particle size is determined not by any functional characteristic of the coloring composition, but by the ability to form a stable dispersion. Similarly, the upper limit on pigment particle size is determined by the type of applicator by which the coloring composition is to be applied or dispensed, since pigment particle size determines the ability of the pigment particles to flow through, for example, the matrix of a marker nib. Indeed, relatively larger pigment particles can restrict coloring composition flow through many types of nibs commonly utilized in writing and marking instruments, ultimately rendering them inoperable. Larger particle sizes can, however, be used where the coloring composition is to be employed in a marker in which the coloring composition is dispensed through a valve assembly (e.g., a paint marker).

The pigment particle size can be adjusted depending on the exact nib type to be utilized in the writing or marking instrument in which the coloring composition will be placed. For example, one preferred form of the coloring composition of the invention can be utilized in a marking instrument having a porous plastic nib on account of the use of an ultrafine pigment dispersion having a particle size range of from about 0.05 μm to about 0.5 μm. Suitable commercial pigment preparations are those incorporating very small (e.g., less than about 0.5 μm) pigment particles. One such ultra fine pigment dispersion preparation is marketed by Clariant (referred to above) under the trade name HOSTAFINE. Another product line of pigment dispersions is manufactured by Heubach and marketed under the trade name HEUCOTECH.

The colorant is generally functionally present in an amount of from about 1% to about 30% by weight of the total coloring composition of the invention. The minimum concentration of colorant which will produce a workable coloring composition is governed by the color intensity desired, though as little as 0.5% colorant may be sufficient for certain applications. The maximum workable concentration of colorant is determined largely by the ability to maintain a stable composition, and can vary widely depending upon the concentration of other components. The maximum amount of colorant is also a function of the characteristics of the desired end product, though a practical upper limit in the formulation of the composition of the invention as, for example, an erasable whiteboard marker ink, is about 30% by weight of the total coloring composition of the invention. Higher concentrations may cause board staining (i.e., ghosting), defeat washability of fabrics and yield an undesirably high viscosity. For hardsurface applications, too much dye raises the viscosity and makes it difficult to add a sufficient amount of film forming resin and/or dyeblocker necessary to yield the desired washability. Preferably, the liquid ink coloring composition should have a viscosity less than 10 cps when used as a marker ink.

When a commercial pigment dispersion is utilized, a practical limit is imposed on the concentration of pigment in the dispersion. The preferred concentration range for most applications is from about 1% to about 10% active pigment by weight of the coloring composition. A concentration of about 3% active pigment by weight is ordinarily required to ensure good coloration in a typical marker ink and most preferred is a concentration of active pigment in a range of about 1.5% to about 5% by weight of the coloring composition. In addition to colorant pigments, white pigments in the form of titanium dioxide may be used to dilute or change a color, eg. added to blue pigment to form an aqua color.

The coloring composition of the present invention also includes an amount of an aqueous or other colorant vehicle effective to form a solution of the remaining components. The preferred dye/pigment vehicle is water. The maximum amount of vehicle is the amount which results in a stable composition and which is capable of forming a mark having the minimum acceptable visibility on a substrate. The minimum amount of water is that necessary to form a stable solution of the components of the coloring composition and provide a composition which can be freely dispensed from the selected dispensing element, where the composition is to be used as a marker ink. Other suitable dye vehicles include alcohol or other water-miscible solvents, such as, for example, a 30% denatured alcohol solution. Compatible mixtures of water and alcohol or other water-miscible solvents may also be used as a dye vehicle. Suitable water/solvent dye vehicles may contain from 0% to 100% alcohol or other water-miscible solvents. Preferably, the colorant vehicle may comprise from 0% to about 50% alcohol or other water-miscible solvents. The proportion of dye vehicle contemplated herein is from about 30% to about 90% by weight of the total coloring composition of the invention. Some or all of the water may be contributed by water found as a portion of one or more of the other components.

The coloring compositions of the invention may also contain a release agent. Where the coloring compositions of the invention are to be used to create marks on a whiteboard, the release agent itself forms a separating film between the surface of the whiteboard and the film forming resin. The film forming resin does not form on the surface of the board, but instead on top of the release agent. As a result, the film forming resin, containing the colorant, may be erased with a dry cloth or eraser. Typical release agents include, but are not limited to, siloxanes, such as polydimethylsiloxanes; polyethylene glycols; monobasic higher fatty carboxylic acid esters; mono- or diesters of dihydric alcohols, wherein the ester has a molecular weight of 100 or more; fatty acid triglycerides; higher hydrocarbons such as paraffin and squalene; polyesters and polyethers having molecular weights of 400 or more; and esters of a polycarboxylic acid with an alcohol.

The preferred release agents are polyalkylene oxide-modified polydimethylsiloxanes sold under the trade name Silwet L-7230.™. and Silwet L-7607.™. by OSi Specialties, Inc. Other useful release agents include, but are not limited to, Silwet L-7608.™. marketed by OSi Specialties, Inc., DCQ43667.™. and FF400.™. marketed by Dow Coming, Carbowax.™. Polyethylene Glycol 1450 marketed by Union Carbide, and Lipopeg 4L.™. marketed by Lipo Chemicals Inc. Mixtures of these release agents may also be utilized in the dry erase coloring compositions of the present invention. The release agent contained in the erasable whiteboard marker ink composition is present in an amount of from about 1% to about 30% by weight of the total coloring composition and, preferably, in an amount of from about 5% to about 15% by weight of the total coloring composition. At a minimum, the release agent must be present in compositions of the invention to be used on whiteboards in an adequate amount to produce compositions that can are easily erasable from the whiteboard. However, when excessive amounts of release agent are used, the composition has an excessively high viscosity, which may render the composition unsuitable for use in conventional markers.

The liquid ink special effect coloring compositions of the invention preferably contain a resin which is water soluble and film forming at room temperature. When marks are formed using the composition of the invention including this film forming resin, and dried on an impervious writing surface, the marks have a continuous resin layer. The water soluble film forming resin also provides the coloring composition with a viscosity suitable for writing when the composition is used in the form of a whiteboard marker ink and helps to prevent staining of the whiteboard. The preferred film forming resin for use in the present invention is polyvinylpyrrolidone sold under the trade name PVP K-15™ by GAF Chemicals Corporation. PVP K-15™ is typically supplied in 30% solution of polyvinylpyrrolidone (i.e., 70% water). Different molecular weight polyvinylpyrrolidone polymers, such as PVP K-30™, and modified polyvinylpyrrolidone polymers, such as polyvinyl acetate-modified polyvinylpyrrolidone, may also be used. Additional useful film forming resins include, for example, but are not limited to, natural resins, such as gum arabic, rosin, or shellac; modified rosins such as rosin esters, hydrogenated rosins, rosin-modified maleic acid resins or rosin-modified phenol resins; various phenol-resins; cellulosic resins such as ethyl cellulose resins or acetyl cellulose resins; ketone resins, polyvinyl alcohol, polyvinyl acetate resins, petroleum resins, polyvinyl butyral resins, vinylpyrrolidone-vinyl acetate copolymer resins or polyacrylic acid ester resins. Mixtures of two or more of these film forming resins may also be employed in the present invention.

The film forming resin should be used in an effective amount. Preferably, the film forming resin is contained in the coloring composition suitable for use on whiteboards is present in an amount of from about 1% to about 40% by weight of the total ink coloring composition and, preferably, in an amount of from about 2% to about 20% by weight of the active film forming resin based on the total composition of the coloring composition of the invention. Most preferably the film forming resin should be present in any amount of from 0.5 to 15% by weight of the colorant composition. Where the film forming resin used is the polyvinylpyrrolidone supplied in solution as PVP K-15™, from about 2% to about 30% by weight of the PVP K-15™ solution based on the total weight of the coloring composition may be used and, preferably, from about 5% to about 15% by weight of the PVP K-15™ solution is used based on the total weight of the coloring composition. The actual amount of film forming resin added to the coloring compositions of the invention depends upon the particular colorant used. When the amount of film forming resin is too large, the resultant dry erase coloring composition has an excessively high viscosity so that it writes poorly and, moreover, the writings formed therewith are not readily erased from a whiteboard.

Other film forming components may also be added to the dry erase coloring compositions of the present invention to provide enhanced washability. Suitable film forming components may include starches. A wide range of starches are suitable including, for example, warm water soluble starch and cold water soluble starch. Preferably, the starch may be added in an amount of from about 2% to about 30% by weight of the coloring composition to beneficially enhance washability. One suitable starch for use in compositions of the present invention is Dri-sweet 42 manufactured by Hubinger Co. Dri-sweet 42 is a cold water soluble starch. Another suitable cold water soluble starch is ICB 3000 manufactured by Staley.

As indicated above, the ink coloring compositions of the invention are especially suitable for use as an hard surface marker ink in which the dye vehicle is water. The erasable marker ink may be supplied in a delivery system, such as a marking instrument, to enable children to color or draw on impervious surfaces such as whiteboards. Suitable nibs for use in such a system are bonded fiber or sintered plastic nibs. A marking pen containing the dry erase coloring composition of the invention in the form of an ink may generally take the form of any conventional marker. Preferably, the marker uses a bonded fiber or sintered plastic nib. The marker reservoir containing the ink can be any standard marker delivery system including, but not limited to, acetate, polyester, or polypropylene fiber systems. In addition, a fiberless system may be used.

In a preferred embodiment of the invention, the coloring composition of the invention is in the form of an erasable whiteboard marker ink. The ink contains a colorant, water, a release agent, a film forming resin, and a amphoteric distyryl whitener additive. Preferably, the amphoteric distyryl whitener product additive is an distyryl biphenyl derivatives and, more preferably, it is selected from the group consisting of salts of Distyrylbiphenyl Disulfonate, e.g. Disodium Distyrylbiphenyl Disulfonate. This instant hard surface marker ink exhibits favorable wet erase characteristics from skin, fabric and other household surfaces.

Compositions of the present invention may, when in the form of an erasable marker ink, also advantageously include a humectant, a surfactant, a preservative, a defoamer, and/or a pH regulant. These materials and their functions are well known, and their mention here is by way of illustration only. Generally, any effective amount of the additive may be used so long as the stability of the coloring composition is not adversely affected and the composition is suitable for use in the desired end product.

For example, it may be possible to include a humectant in an erasable whiteboard marker ink to retard the evaporation of water from the ink solution. This avoids unduly rapid drying of the ink in the marker nib which can cause clogging of the nib and impair the function of the marker. Further, a humectant may improve freeze/thaw stability of the inventive ink compositions. Typical humectants include polyhydric alcohols such as glycerine, propylene glycol, ethylene glycol, and diethylene glycol, hydroxylated starches, low molecular weight (m.w.=200-400) poly(ethylene glycols), and mixtures of these materials. Any effective amount of humectant may be used although a generally useful concentration range for these humectants is from about 5% up to about 30% by weight of the total coloring composition.

Surfactants in any effective amount (generally up to about 0.1% by weight) may also be included in the preferred erasable whiteboard marker ink compositions of the invention for the purpose of adjusting such properties as viscosity (for proper dispensing of ink through the nib), and surface tension (for good flow properties and nonporous surface wetting). Anionic surfactants, nonionic surfactants, such as poly(ethylene glycol)ether, alkylaryl polyether alcohol, fluorinated alkyl esters, and mixtures of such materials are preferred for use in the compositions of the invention when in the form of erasable whiteboard marker inks.

Preservatives of conventional types are also advantageously employed in the compositions of the invention to extend the shelf life of the composition. The preservative preferably serves as both a bactericide and a fungicide. Some typical preservatives useful in the present invention include methyl p-hydroxybenzoate, glutaraldehyde, hydroxybenzoic acid esters, 3-iodo-2-propynyl butyl carbamate, bicyclic oxazolidones, and a biocide comprising as the active ingredients 5-chloro-2-methyl-4-isothiazolin-3-one and, 2-methyl-4-isothiazolin-3-one. Preservatives are usually effective when present in any effective amount but generally are present in amounts of from about 0.1% up to about 1% by weight. Preferred preservatives include Kathon PFM.™. (isothiazolinones) manufactured by Rohm and Haas, and Nuosept 95.™. (bicyclic oxazolidines solutions) manufactured by Huls America.

The pH of the coloring compositions of the present invention is preferably in the range of about 3.0 to about 10.0, more preferably about 4.0 to about 9.0. To maintain this pH, a pH regulant may be employed. Preferably, neutralized versene is used as a pH regulant. In addition to controlling pH, neutralized versene may also help ease the erasability of some dyes from whiteboards when compositions of the invention are used as whiteboard marker inks. The pH regulant may be added in an amount ranging from about 0% to about 20% by weight. In one preferred composition, the pH regulant, neutralized versene, is added in an amount of about 10% by weight of the total erasable whiteboard marker ink composition.

The coloring compositions of the present invention may also contain a defoamer to prevent foaming during mixture of the various components. Suitable defoamers include silicones and siloxanes. The preferred defoamer is Tego Foamax 800.™. marketed by Goldschmidt Chemical Corp. Other suitable defoamers include Zerofome AF-200.™. marketed by NuTech Corp., Surfynol DF58.™. marketed by Air Products, and Foamaster H.™. marketed by Henkel. The addition of defoamer to the coloring compositions of the present invention does not adversely affect either the removability from whiteboards or washability when the compositions are used as whiteboard marker inks. The amount of defoamer depends upon the amounts of other components present in the coloring composition, although typically about 0.1% to about 5% by weight of the total dry erase coloring composition is used.

The coloring compositions of the present invention can be prepared in any suitable manner. For example, the pigments, dyes, colorant vehicle, release agent, film forming resin, and whitener along with other optional components (e.g., preservatives and humectants) can be added to a suitable vessel and mixed until a suitable solution is obtained.

In addition to the nib/reservoir capillary marking device described above, the coloring ink composition of the present invention can be applied by any means known for applying fluid to a substrate. For example, the composition can be applied with a paint brush, a split-tip fountain pen, a roller ball (which is analogous to a ball-point pen but has a much larger ball and uses much less viscous coloring composition than a conventional ball-point pen), an aerosol can or other fluid spraying apparatus, an absorbent pad, a paint roller, printing equipment, or other apparatus used for dispensing fluids having the properties of the present coloring composition. Preferably, the composition is suitably fluid for use in such marking instruments and has a viscosity of from about 1 to about 20 centipoises (cps). Thus, for use in a such a standard marking instrument, the viscosity of the coloring composition preferably is from about 3 cps. to about 10 cps. (e.g., from about 4 cps. to about 8 cps.), and most preferably from about 5 cps. to about 7 cps. (e.g., about 6 cps.).

A capillary marker is the preferred instrument for applying the instant ink coloring composition. A capillary marker has a reservoir and a capillary nib. The reservoir of a typical capillary marker is an absorbent body stored in the handle of the marker. Any suitable reservoir compatible with the coloring composition can be used, such as, for example, an extruded polyester reservoir. The reservoir contains the coloring composition charge of the marker, and is capable of transferring coloring composition to the capillary nib. The nib of a capillary marker has one end in contact with the reservoir and a writing tip for contacting a substrate as its other end. The nib wicks the coloring composition from the reservoir to its writing tip. The writing tip of the nib is drawn across the surface of a substrate to be marked, dispensing the fluid on the surface. The nib can be made of any porous, preferably resilient material. Preferably, a porous plastic nib is used, but other nibs, such as pulltruded hollow nibs, ordinary felt nibs, and bonded fiber nibs, are also suitable; for example, the nib can have a well-defined, non-wearing writing tip, such as a chisel tip. As is conventional in the capillary marker art, the tip can have edges of different dimensions. The same marker can be used to make bolder or lighter lines by drawing with one or another edge of the tip in contact with the writing medium.

While it is believed that one of skill in the art is fully able to practice the invention after reading the foregoing description, the following examples further illustrate some of its features. As these examples are included for purely illustrative purposes, they should not be construed to limit the scope of the invention in any respect.

EXAMPLES

Examples of coloring compositions of the present invention are as follows. These examples further illustrate the present invention but, of course, should not be construed as in any way limiting its scope. Quantities are in percent by weight of the total composition. These example compositions are suitable for use in marking on whiteboards.

Different coloring compositions were prepared using various pigment dispersions and a Disodium Distyrylbiphenyl Disulfonate whitener additive. These compositions were formulated in the form of liquid marker inks. These compositions containing a colorant, a film forming resin, a release agent, and amphoteric distyryl whitener additive are set forth below in Examples 1-4. In all the examples, the amphoteric distyryl whitener additive is Disodium Distyryl-biphenyl Disulfonate.

Example 1

Red

| Component | wt. % |
|---|---|
| Deionized water (colorant vehicle) | 52.54 |
| C.I. Pigment Red 184 Dispersion (Hostafine Rubine F6B-Clariant) | 11.00 |
| Tinopal CBS-X 44# (amphoteric distyryl whitener product) | 19.97 |
| PVP K-30 (30% solution) (film forming resin) | 5.14 |
| Silwet L-7607 (release agent) | 9.99 |
| Nuosept 95 (preservative) | 0.30 |
| Kathon PFM (preservative) | 0.08 |

Example 2

Blue

| Component | wt. % |
|---|---|
| Deionized water (colorant vehicle) | 44.62 |
| C.I. Pigment Blue Dispersion (Hostafine Blue B2G-Clariant) | 5.00 |
| Tinopal CBS-X 44# (amphoteric distyryl whitener product) | 20.00 |
| PVP K-15 (30% solution) (film forming resin) | 10.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 3

Yellow

| Component | wt. % |
|---|---|
| Deionized water (colorant vehicle) | 66.62 |
| C.I. Pigment Yellow 13 Dispersion (Hostafine Yellow GR-Clariant) | 2.00 |
| Tinopal CBS-X 44# (amphoteric distyryl whitener product) | 10.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 4

Aqua

| Component | wt. % |
|---|---|
| Deionized water (colorant vehicle) | 36.70 |
| C.I. Pigment Yellow 13 Dispersion (Hostafine Yellow GR-Clariant) | 3.60 |
| C.I. Pigment Blue Dispersion (Hostafine Blue B2G-Clariant) | 1.40 |
| PVP K-30 (30% solution) (film forming resin) | 4.72 |
| Titanuum Dioxide (white Pigment Dispersion from Cadre, Inc) | 21.00 |
| TAMOL-731A (release agent) | 2.80 |
| Carbowax 400 (release agent) | 2.35 |
| Glycerin USP (release agent) | 2.35 |
| 2-AMINO-2-METHYL-1-PROPANOL (pH stabilizer) | 0.235 |
| MILD BSB (surfactant) | 9.4 |
| Citric Acid (C1282) (buffer) | 5.27 |
| Kathon PFM (preservative) | 0.0840 |
| Tinopal CBS-X 44# (amphoteric distyryl whitener product) | 10.00 |

Each of the four coloring compositions exhibited the special effect of day-glow and fluorescence under a light source along with superior fugitivity with respect to skin and fabrics. Each of them was sufficiently fluid to work in common markers, and in each of the markers tested, they performed well, without nib drying even up to 90 minutes of "cap off" time in 40% humidity at room temperature. When applied to porous paper, each exhibited minimal strike-through. Moreover, the compositions remained stable at elevated temperatures, neither thickening appreciably nor exhibiting significant color shifting.

All of the references cited herein, including patents, patent applications, and publications, are hereby incorporated in their entireties by reference.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed:

1. A washable ink coloring composition comprising:
   a) a colorant comprising one or more pigment dispersion solutions, or combinations thereof, in amounts of from about 1.0 wt % to about 30 wt % of active pigment, wherein said coloring composition has a pH of from about 3 to about 10;
   a) from about 1 wt. % to about 40 wt % of a film-forming resin,
   b) from about 1 wt. % to about 20 wt % of an amphoteric distyryl fluorescent whitener in the form of Disodium Distyrlbiphenyl Disulfonate, and
   c) from about 30 wt. % to about 90 wt % aqueous carrier.

2. The washable ink coloring composition of claim 1, having a pH of from about 4 to about 9.

3. The washable ink coloring composition of claim 1, having a viscosity of from about 3 cps. to about 10 cps.

4. The coloring composition of claim 1, wherein said film-forming resin represents about 15% to about 30% by weight of said aqueous coloring composition.

5. The coloring composition of claim 1, wherein said film-forming agent comprises polyvinylpyrrolidone.

6. A marking instrument containing an ink composition comprising: (a) a colorant comprising a pigment; (b) a pigment vehicle; (c) a film forming resin; and (c) an amphoteric distyryl fluorescent whitener in the form of Disodium Distyrlbiphenyl Disulfonate in an amount of at least 1% by weight of the composition, the amount being sufficient to render the composition fluorescent and capable of a glow effect in daylight and dark environments and to enhance the fugivity of the composition from skin and fabric.

7. The marking instrument of claim 6, wherein said instrument comprises a nib and a reservoir containing the ink composition.

8. The writing instrument of claim 7, wherein said nib is porous plastic.

* * * * *